(12) United States Patent
Koike et al.

(10) Patent No.: US 7,061,375 B2
(45) Date of Patent: Jun. 13, 2006

(54) SYSTEM FOR WARNING A FAILURE TO WEAR A SEAT BELT

(75) Inventors: Makoto Koike, Wako (JP); Naoki Fukui, Wako (JP); Tsutomu Terasaki, Wako (JP)

(73) Assignee: Honda Motor Co., Ltd., Minato-ku (JP)

( * ) Notice: Subject to any disclaimer, the term of this patent is extended or adjusted under 35 U.S.C. 154(b) by 101 days.

(21) Appl. No.: 10/761,586

(22) Filed: Jan. 21, 2004

(65) Prior Publication Data

US 2004/0178902 A1    Sep. 16, 2004

(30) Foreign Application Priority Data

Mar. 12, 2003  (JP) .............................. 2003-066095
Mar. 12, 2003  (JP) .............................. 2003-066106

(51) Int. Cl.
*B60Q 1/00* (2006.01)
(52) U.S. Cl. ................ 340/457.1; 340/425.5; 340/457; 340/438
(58) Field of Classification Search .......... 340/457.1, 340/438, 457, 439, 384.4, 384.71; 701/1, 701/96
See application file for complete search history.

(56) References Cited

U.S. PATENT DOCUMENTS

| | | | | |
|---|---|---|---|---|
| 3,582,949 A * | 6/1971 | Forst | ........................... | 340/502 |
| 4,947,164 A * | 8/1990 | Bateman | ...................... | 340/968 |
| 5,153,588 A * | 10/1992 | Muller | ........................ | 340/968 |
| 5,272,464 A * | 12/1993 | Jorgensen | .................... | 340/438 |
| 5,483,221 A * | 1/1996 | Mutter et al. | ............. | 340/457.1 |
| 5,648,755 A * | 7/1997 | Yagihashi | .................... | 340/439 |
| 5,954,781 A * | 9/1999 | Slepian et al. | ................ | 701/96 |
| 6,037,862 A * | 3/2000 | Ying | ........................... | 340/441 |
| 6,127,944 A * | 10/2000 | Daly et al. | ................... | 340/963 |
| 6,289,332 B1 * | 9/2001 | Menig et al. | ................... | 707/1 |
| 6,374,173 B1 * | 4/2002 | Ehlbeck | ....................... | 701/93 |
| 6,501,374 B1 * | 12/2002 | King et al. | .............. | 340/457.1 |
| 6,556,903 B1 * | 4/2003 | Chinigo et al. | ............... | 701/29 |

FOREIGN PATENT DOCUMENTS

EP         1 362 752       11/2003
JP          57-83042        7/1987

* cited by examiner

*Primary Examiner*—Jeffery Hofsass
*Assistant Examiner*—Hoi C. Lau
(74) *Attorney, Agent, or Firm*—Hamre, Schumann, Mueller & Larson, P.C.

(57) ABSTRACT

In a system for warning a failure to wear a seat belt to urge a vehicle operator to wear the seat belt, a sound emitter is activated when a vehicle speed is higher than a threshold level and the seat belt is not fastened. The sound emitter cyclically alternates between a sound emitting state and a silent state when activated, the silent state lasting for a period of at least three seconds each time. Because the silent state is interposed between sound emitting states and because the warning is not emitted when traveling for a short period of time at a low speed, for instance, in a parking garage or the like or when the vehicle is stationary, the annoyance to the vehicle operator is minimized while allowing the vehicle operator to be kept warned.

20 Claims, 7 Drawing Sheets

SYSTEM FOR WARNING A FAILURE TO WEAR A SEAT BELT

TECHNICAL FIELD

The present invention relates to a system for giving a warning to a vehicle operator who fails to wear a seat belt and urging him or her to wear the seat belt.

BACKGROUND OF THE INVENTION

It is widely known that a seat belt can minimize injuries to the vehicle operator in case of a vehicle crash. The traffic law requires the vehicle operator to wear a seat belt. However, unfortunately, there still are some people who do not fully appreciate the importance of the seat belt, and fail to wear the seat belt when traveling in a motor vehicle.

Therefore, various alarm systems have been proposed to the end of urging the vehicle operator to wear a seat belt. For instance, Japanese utility model publication No. 62-29319 discloses an alarm device that issues a warning when the seat belt is not worn and the vehicle speed is higher than a prescribed level.

However, conventional devices of this kind have a problem. Because the alarm is issued only once when the vehicle speed has reached the prescribed level, for instance, as is the case with the invention disclosed in the utility model publication mentioned earlier, the alarm is simply lost when the alarm is disregarded by the vehicle operator. Conversely, if the alarm is issued constantly, the vehicle operator may find it so annoying that he or she may stop using the vehicle.

Also, because conventional devices of this kind simply lights up a warning lamp and emits a warning sound, a vehicle operator not accustomed to the particular vehicle may be unable to comprehend the meaning of the warning. This is not desirable because it causes a discomfort to the vehicle operator.

Furthermore, because other alarm devices such as a warning against failure to release a parking brake and a warning that a reverse range is selected have been added to the vehicle, the vehicle operator may well confuse the warnings particularly when a plurality of alarms are issued at the same time as the seat belt alarm.

BRIEF SUMMARY OF THE INVENTION

In view of such problems of the prior art, a primary object of the present invention is to provide a system for warning a failure to wear a seat belt which can effectively urge the vehicle operator to wear the seat belt without excessively annoying the vehicle operator.

A second object of the present invention is to provide a system for warning a failure to wear a seat belt which can produce a warning distinctive enough not to be confused with other warnings.

A third object of the present invention is to provide an improved system for warning a failure to wear a seat belt which allows the vehicle operator to recognize the meaning of the particular warning and to take an appropriate measure in response to the warning.

According to the present invention, such problems can be accomplished by providing a system for warning a failure to wear a seat belt to urge a vehicle operator to wear the seat belt, comprising: a sound emitter for emitting a warning sound; a seat belt sensor for detecting a fastened state of a seat belt; a vehicle speed sensor; and an electronic controller for receiving a detection signal from the seat belt sensor and a vehicle speed signal from the vehicle speed sensor, and activating the sound emitter according to the detection signal from the seat belt sensor and vehicle speed signal from the vehicle speed sensor; wherein the electronic controller is adapted to activate the sound emitter when a vehicle speed is higher than a first threshold level and the seat belt is not fastened, the sound emitter cyclically alternating between a sound emitting state and a silent state when activated. The silent state may last, for instance, for a period of at least three seconds each time.

Thereby, the warning is not emitted when traveling for a short period of time at a low speed, for instance, in a parking garage or the like or when the vehicle is stationary so that the annoyance to the vehicle operator may be minimized. Because the alarm sound is interposed by silent intervals (silent states) of a substantial duration, the vehicle operator would not be excessively annoyed while being kept warned. The time duration of each silent state may preferably be longer than 12 seconds. The system may further comprise an alarm lamp that lights up in each sound emitting state of the sound emitter to indicate the meaning of the warning. To more effectively keep the vehicle operator warned, the alarm lamp may be kept lighted up substantially continually throughout the time the sound emitter is activated.

The sound emitter may emit sound continually during each sound emitting state but may also emit sound intermittently during each sound emitting state. Thereby, the same sound emitter may be used for providing other kinds of warnings by suitably changing the intermittent pattern. The warning lamp may also blink in synchronism with the intermittent sound emitted from the sound emitter.

A waiting period may be provided before the activation of the sound emitter so that the sound emitter may not be activated unnecessarily.

According to a preferred embodiment of the present invention, the system further comprises a sensor for detecting an alarm state having a higher priority than a failure to wear a seat belt, the electronic controller being adapted in such a manner that the activated state of the sound emitter is superseded by an activation of a second sound emitter in a pattern different from the sound emitting state of the first mentioned sound emitter as an interrupt routine as soon as the higher priority alarm state is produced, and that the activation of the first sound emitter is resumed as a continuation of a preceding state of the first sound emitter as soon as the higher priority alarm state is canceled. Thereby, the higher priority warning can be issued without any delay.

According to another preferred embodiment of the present invention, the system further comprises a sensor for detecting an alarm state having a lower priority than a failure to wear a seat belt, the electronic controller being adapted in such a manner that a second sound emitter is activated in a pattern different from the sound emitting state of the first mentioned sound emitter only during the silent state of the first sound emitter when the lower priority alarm state is produced.

If the system further comprises a display panel, warnings other than that for a failure to wear a seat belt can be displayed without any problem. Even when the other warning (such as that for a failure to release a parking brake) is issued at the same time as the belt warning, the vehicle operator is allowed to recognize that the two warnings have been issued at the same time by suitably alternating the two different warning displays.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
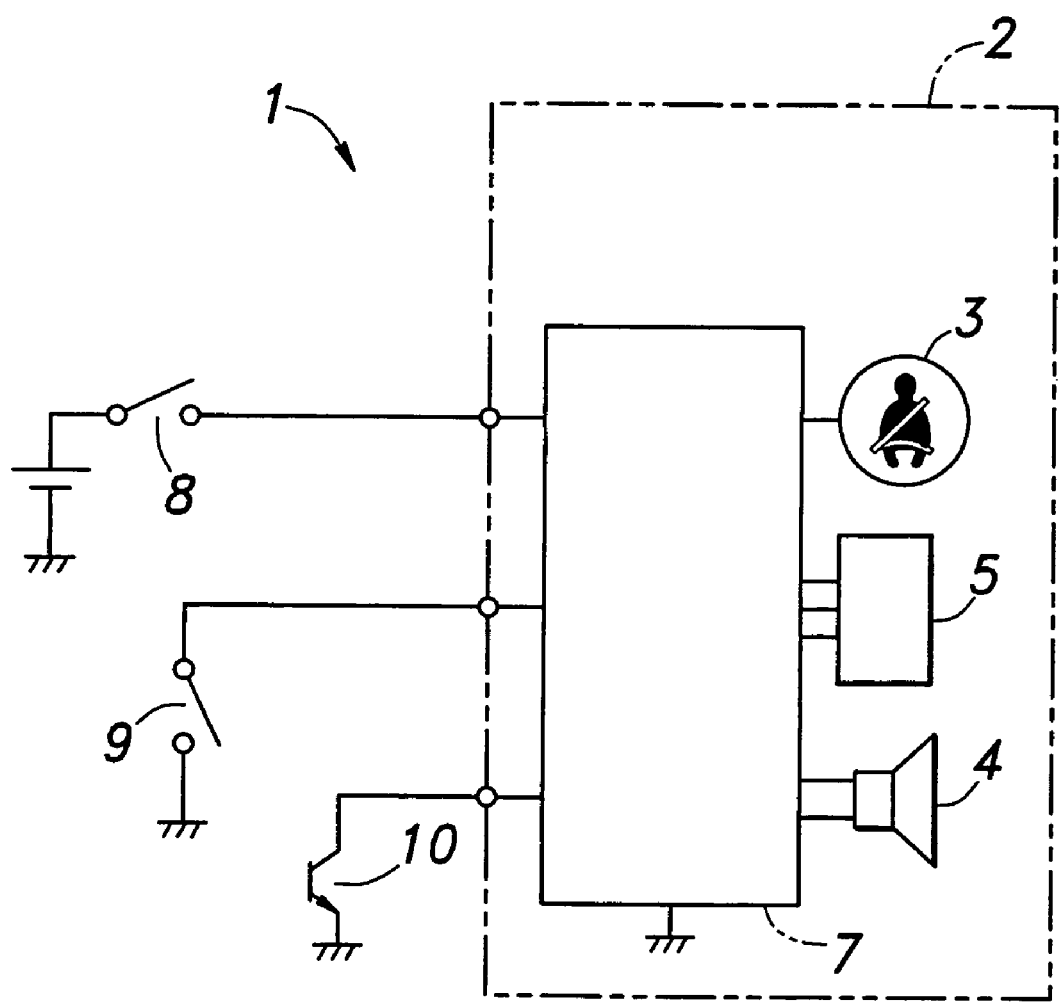
FIG. 1 is a schematic diagram of a seat belt warning system embodying the present invention.

FIG. 1 is a schematic diagram of a system for warning a failure to wear a seat belt embodying the present invention. This alarm system 1 comprises a belt lamp (warning light) 3 and a belt alarm (sound emitter) 4 placed in suitable parts of an instrument panel 2, a display panel 5 consisting of a display device such as LCD and an electronic controller 7 for controlling these components. The electronic controller 7 receives an ON signal from an ignition switch 8, a belt detection signal from a seat belt sensor 9 provided in a seat belt buckle and a vehicle speed signal from a vehicle speed sensor 10, and controls the belt lamp 3 and belt alarm 4 in dependence on the existing state according to a prescribed condition.

The belt alarm 4 is adapted in such a manner that the contents of the alarm may be distinguished from each other from the period of intermittent sound emission (intermittent pattern). It may sound such as "pi-pi-pi- . . . ", "pi, pi, pi, . . . " or "pee, pee, pee, . . . ". The belt alarm 4 is also adapted to alternate cyclically between a sound emitting state during which sound is intermittently emitted and a silent state during which no sound is emitted (each cycle consisting of a sound emitting interval of six seconds and a silent interval of 24 seconds, for instance) for a prescribed number of times (18 times, for instance). The belt lamp 3 blinks in synchronism with the intermittent sound emission, and lights up continually during the silent interval.

Figure 2:
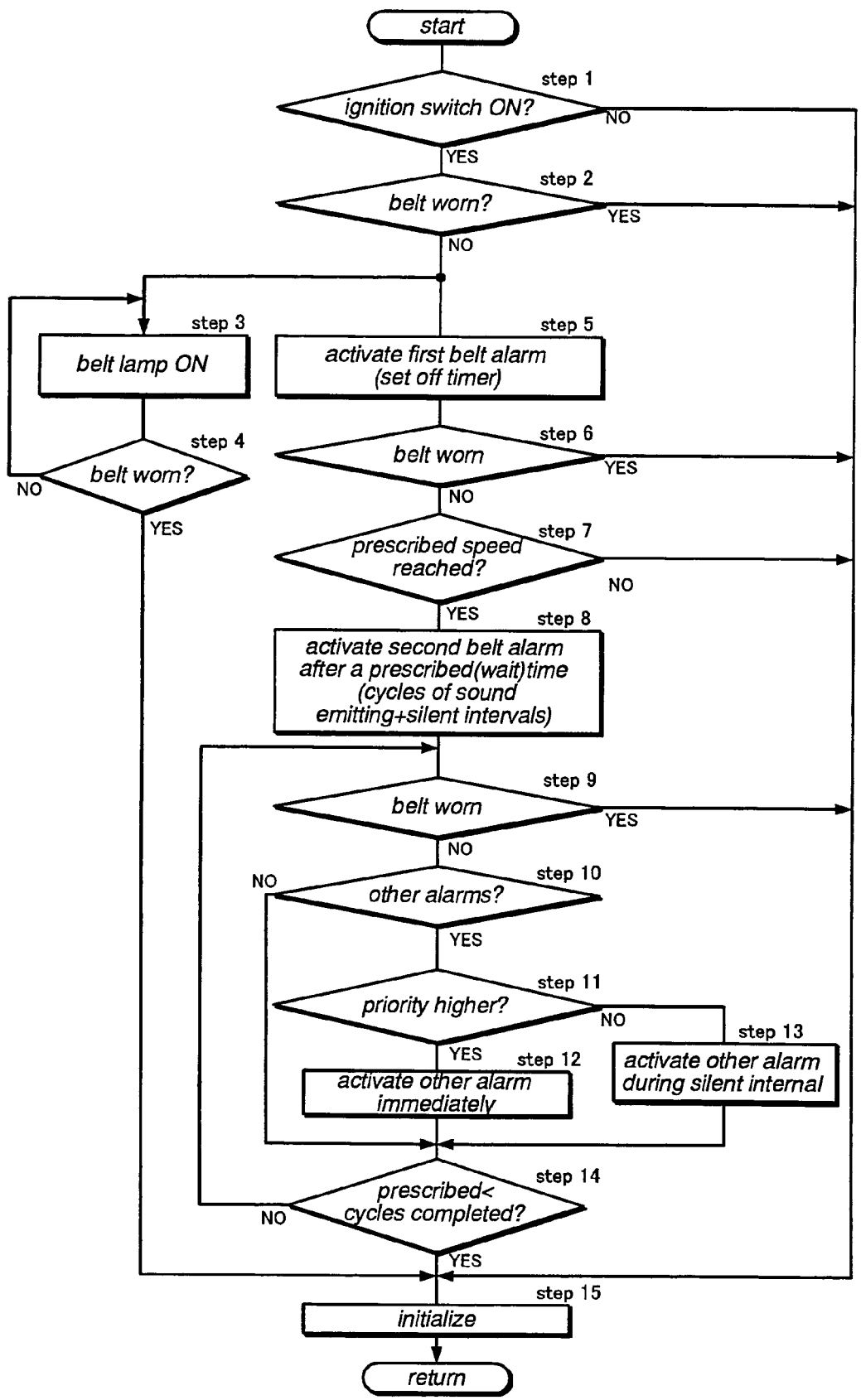
FIG. 2 is a flowchart of the basic control process.

The basic control action of the alarm system 1 is executed according to the control flow illustrated in FIG. 2. First of all, it is determined if the ignition switch 8 has been turned on (step 1). If the ignition switch 8 has been turned on or if the engine is running, it is determined if the seat belt is worn (step 2). If the seat belt is not worn, the belt lamp 3 lights up (step 3). The belt lamp 3 is kept lighted up throughout the time the engine is running until the wearing of the seat belt is detected in step 4.

When it is determined that the seat belt is not worn in step 2, a first belt alarm is also activated by activating the belt alarm 4 and this sets off a timer at the same time (step 5). If it is not detected in step 6 that the seat belt is worn in a prescribed time period, it is determined if the vehicle speed is higher than a prescribed speed (step 7).

If it is determined in step 7 that the vehicle speed is higher than the prescribed speed, the second belt alarm is activated (step 8) by activating the same belt alarm 4. During the time the second belt alarm is activated, it is monitored if the seat belt is worn (step 9) and, at the same time, if any other alarms are activated (step 10).

If it is determined in step 10 that there is a demand for any other alarm, the priority of this alarm in relation with the seat belt alarm is determined in step 11. If the priority of this other alarm is higher than that of the seat belt alarm, it is immediately activated as an interrupt routine (step 12). If the priority of this other alarm is lower than that of the seat belt alarm, it is activated during a next silent interval of the second belt alarm (step 13). The second belt alarm is thereafter activated cyclically until the completion of a prescribed number of cycles is detected in step 14.

As soon as the seat belt is worn while the engine is running, the alarm control is immediately canceled, and the program is initialized (step 15). This program is repeatedly executed at a regular interval after an appropriating waiting time until the wearing of the seat belt is detected. Therefore, once the seat belt is worn, if the seat belt is removed without stopping the engine, the second belt alarm is activated. If the engine is stopped and restarted, various steps following the first belt alarm are executed.

The mode of operation of this system is described in the following by taking a specific example with reference to the appended time charts (FIGS. 3 to 7).

Figure 3:
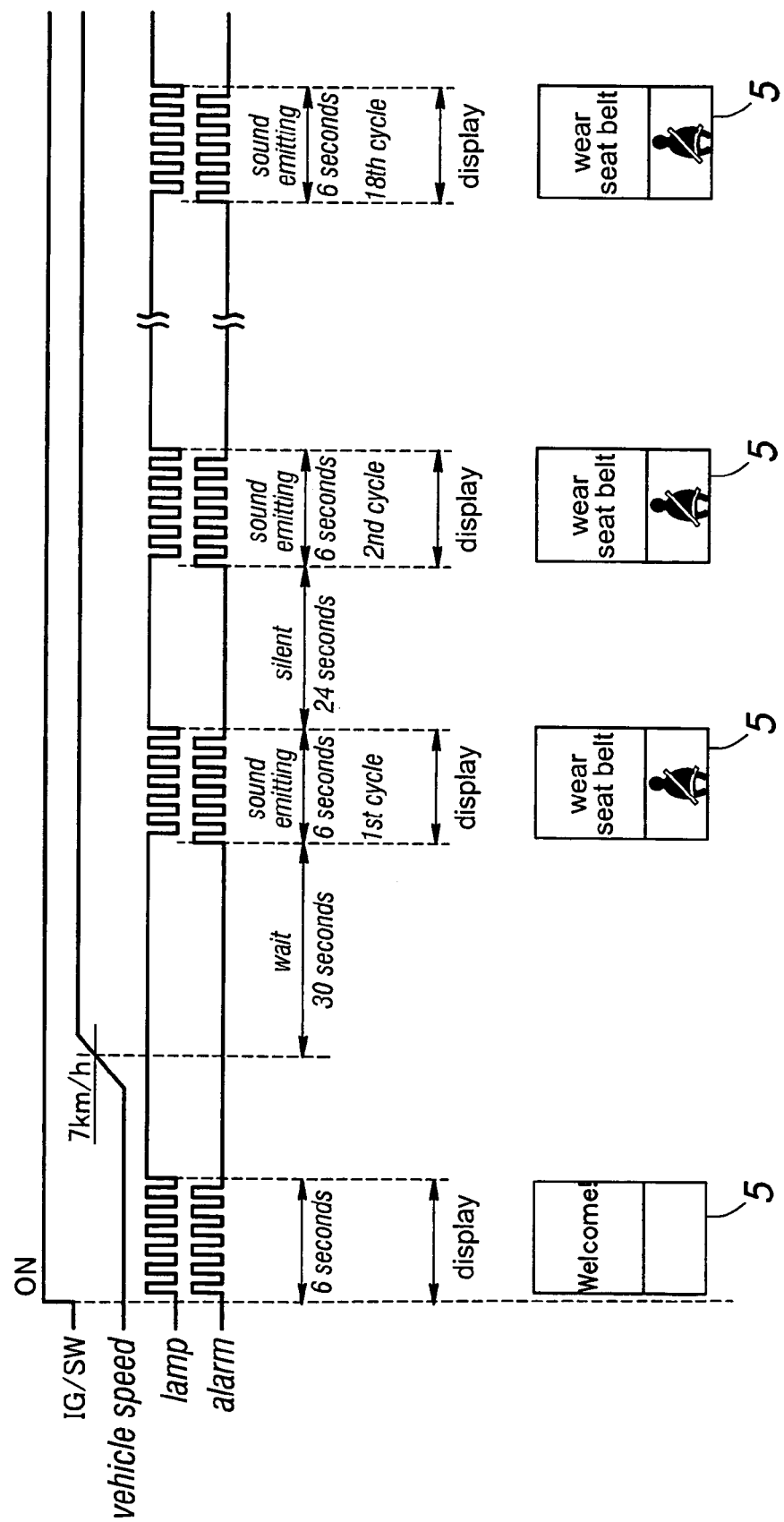
FIG. 3 is a time chart of the basic operation of the system.

When the engine of a stationary vehicle is started and the seat belt is not worn, as shown in FIG. 3, the first belt alarm consisting of an intermittent sound is set off for a prescribed period of time (six seconds, for instance) while the belt lamp 3 is turned on at the same time. The fact that the belt lamp 3 turns on and off in synchronism with the first belt alarm improves the chance of drawing the attention of the vehicle operator. The belt lamp 3 and belt alarm 4 may turn on and off at a same or opposite phase.

During the time the first belt alarm is in progress, the LCD display panel 5 may not show anything but may also show something like a screensaver. This display panel 5 may consist of a known type such as those used in mobile phones, and is capable of providing various visual displays including texts and graphics so that a variety of information can be given to the vehicle operator.

When the vehicle has started moving, the vehicle speed is monitored. The vehicle speed condition for the second belt alarm is provided with a certain hysteresis in such a manner that the second belt alarm sets off when the vehicle speed reaches 7 km/h, and stops when the vehicle speed drops below 3 km/h. In other words, the second belt alarm would not set off until the vehicle has started moving and the vehicle speed has reached 7 km/h, and turns off only when the vehicle speed has dropped below 3 km/h. The second belt alarm is activated only when the seat belt is not worn and the vehicle speed remains above 7 km/h for a prescribed time period (30 seconds, for instance). The second belt alarm consists of 18 cycles of a sound emitting interval of six seconds and a silent interval of 24 seconds, and this routine of 18 cycles is repeated after a waiting period of 30 seconds, for instance, until it is detected that the seat belt is worn.

The display panel 5 provides a text display and/or a graphic display urging the vehicle operator to wear a seat belt during each sound emitting interval of the second belt alarm, and does not do so during each silent interval.

Figure 4:
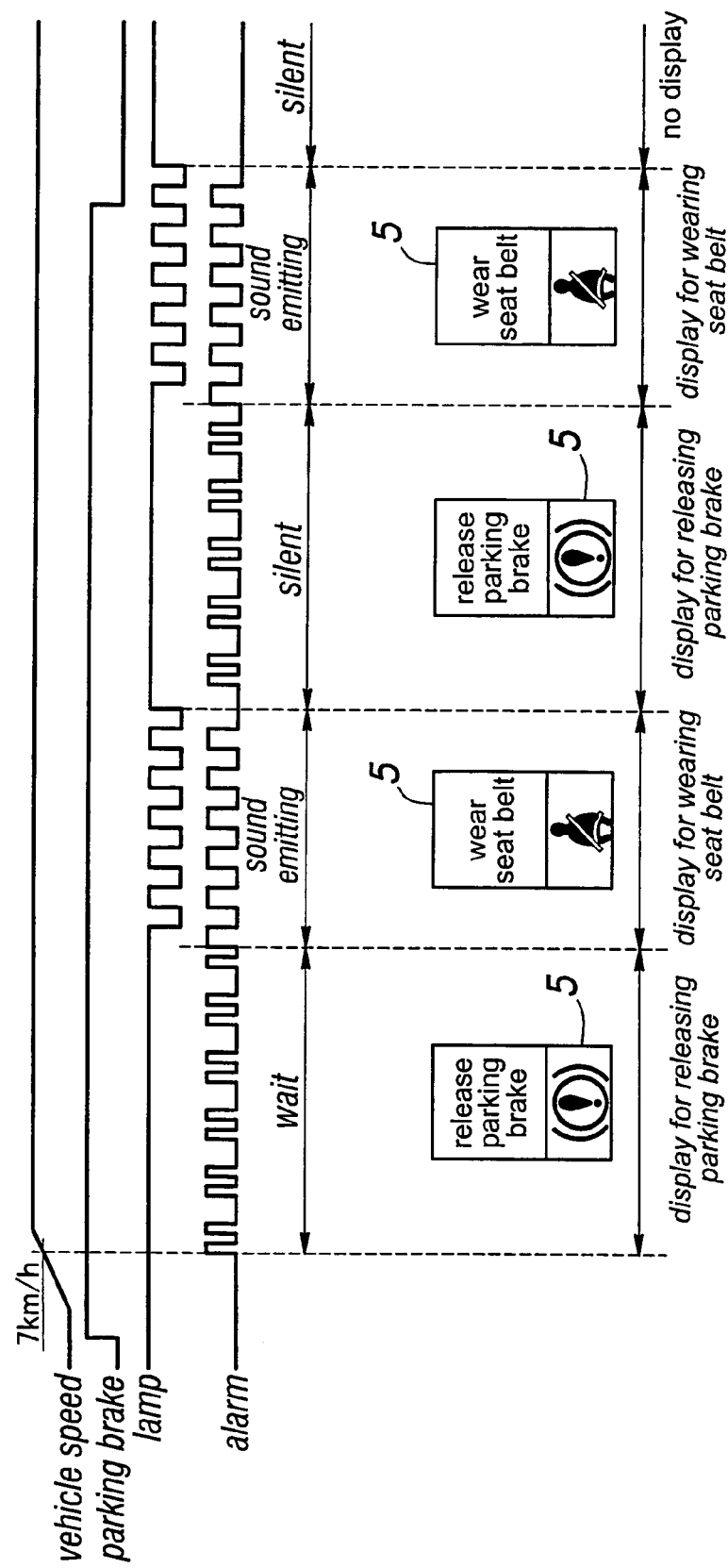
FIG. 4 is a time chart of the control process for interposing a lower priority warning.

When an alarm command having a lower priority than the seat belt alarm (in this case, consisting of an alarm for a failure to release the parking brake) is issued, it is necessary to issue alarms for both the failure to wear a seat belt and the failure to release the parking brake. In such a case, as shown in FIG. 4, the intermittent pattern corresponding to the lower priority alarm is produced during a silent interval or a waiting period of the second belt alarm. By sounding the lower priority alarm over each entire silent interval of the second belt alarm, the lower priority alarm can be made distinct from the sound emitting intervals of the second belt alarm. The intermittent pattern for this lower priority alarm should be selected so as to not to be excessively annoying even when it is sounded continuously.

In this case, the vehicle operator may fail to recognize the meaning of the alarm from the intermittent pattern of the sound emitted from the sound emitter. Therefore, according to the present invention, the display panel 5 shows the contents of the warnings or both the need to wear the seat belt and release the parking brake in both text and graphic representations. More specifically, the display 5 shows a parking brake warning during the waiting period and each silent interval, and a seat belt warning during each sound emitting interval.

By thus allowing information other than the warning to a failure to wear a seat belt to be interposed during each silent interval of the second belt alarm, a plurality of warnings can be conveyed to the vehicle operator in a reliable fashion.

Figure 5:
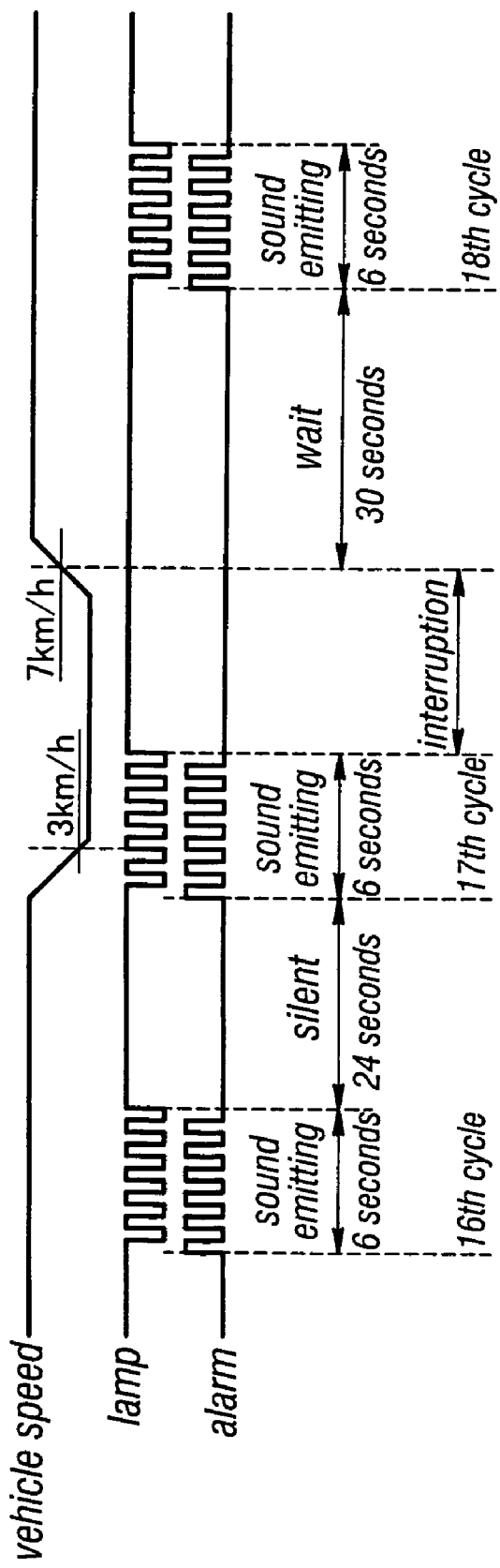
FIG. 5 is a time chart of the control process when the vehicle speed has dropped a certain level.

When the vehicle speed has dropped below 3 km/h while the second belt alarm is in progress, as shown in FIG. 5, the second belt alarm cycles (18 cycles) are interrupted. For instance, when the vehicle speed has dropped below 3 km/h during the sound emitting interval of the 17th cycle, the activation of the second belt alarm is interrupted upon completion of the sound emitting interval (six seconds). When the vehicle speed has exceeded 7 km/h once again, after elapsing of the waiting period of 30 seconds, the remaining cycles (the 18th cycle in the illustrated embodiment) are executed. Because the belt lamp 3 is not particularly annoying, it is kept turned on during each silent interval.

Figure 6:
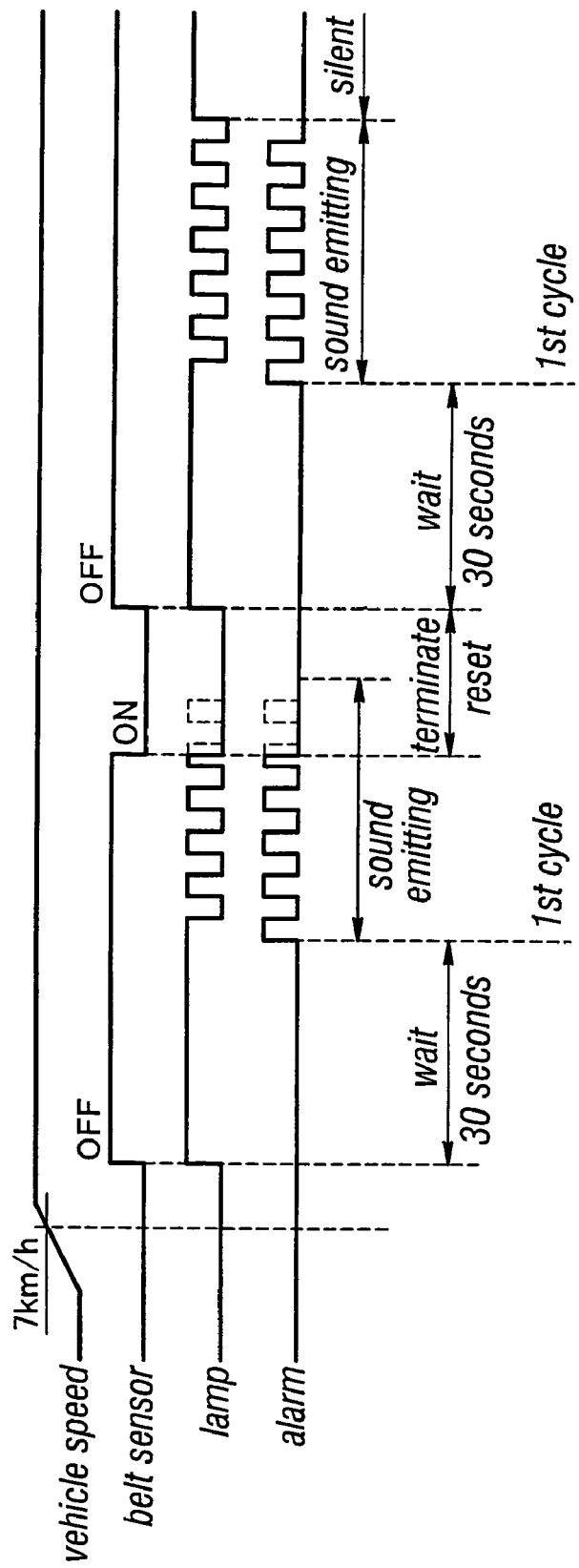
FIG. 6 is a time chart of the control process when the seat belt is removed and worn again while the vehicle is traveling.

When the seat belt is removed and worn at a vehicle speed exceeding 7 km/h, as shown in FIG. 6, because the fastening of the seat belt initializes the program, the belt lamp 3 turns on as soon as the seat belt is removed or the unfastening of the seat belt is detected, and the second belt alarm is activated upon elapsing of the waiting period of 30 seconds. In this case, because the first belt alarm had been activated immediately after the ignition switch was turned on, the first belt alarm would not be activated, but the second belt alarm is activated from the sound emitting interval of the very first cycle.

When the wearing of the seat belt is detected during a sound emitting interval of the second belt alarm, the alarm is immediately deactivated, and the program is initialized. Therefore, when the removal of the seat belt is detected next time, the alarm process is started from the waiting period.

Figure 7:
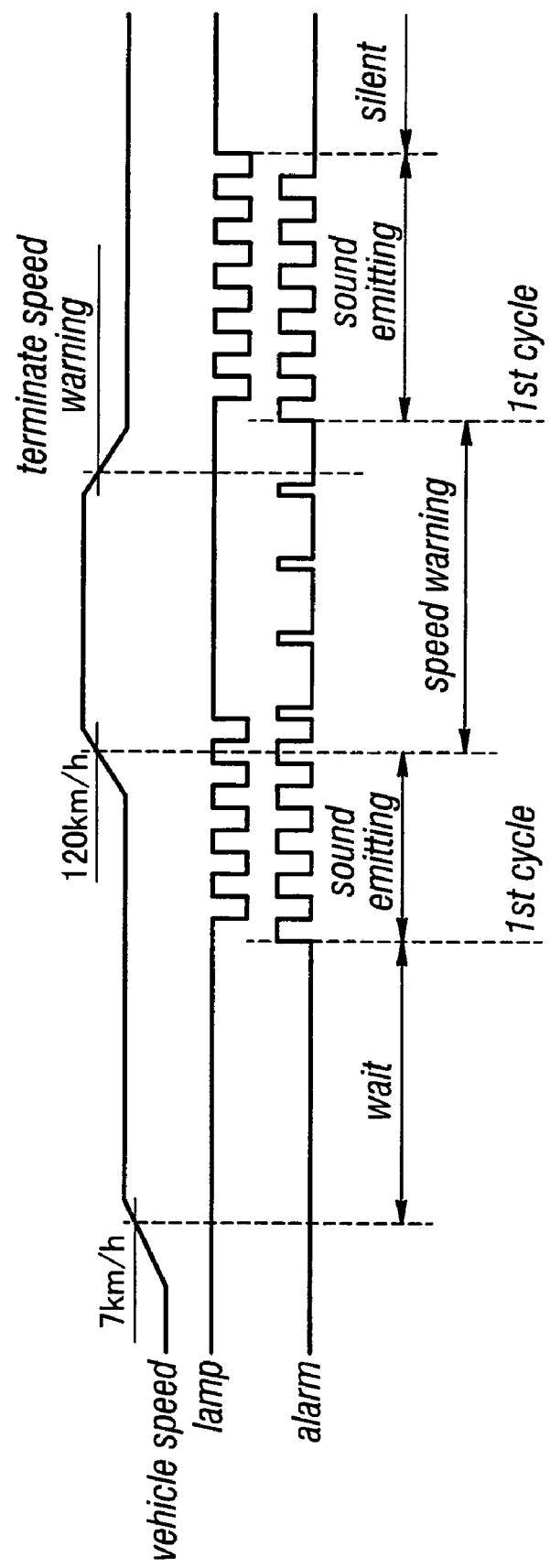
FIG. 7 is a time chart of the control process when a higher priority alarm has intervened.

When an alarm command having a higher priority than the seat belt alarm (such as an over speed alarm) is issued, as shown in FIG. 7, the seat belt alarm is immediately superseded by the higher priority alarm, and an alarm signal having an intermittent pattern different from that of the seat belt alarm is produced. The display 5 in this case may show a warning display for the higher priority alarm continuously until the higher priority alarm is canceled. When the higher priority alarm has stopped, the seat belt alarm is resumed, and the remaining cycles including the sound emitting interval during which the seat belt alarm was interrupted are executed once again.

In this case, the seat belt lamp is kept turned on as before without regard to the higher priority alarm. Because the same sound emitter is used and the different kinds of alarm are distinguished by the intermittent patterns, one kind of alarm should be taken over another at any convenient break of the intermittent pattern.

The priority order of alarms may be selected such that selecting the reverse position of an automatic transmission>a high speed exceeding a prescribed limit>a missing card key or a low battery for the card key>failure to wear a seat belt>failure to release a parking brake, for instance. This priority order may be suitably selected depending on the legal restrictions of the region in which the vehicle is in use, the performance of the vehicle or other factors.

Although the present invention has been described in terms of a preferred embodiment thereof, it is obvious to a person skilled in the art that various alterations and modifications are possible without departing from the scope of the present invention which is set forth in the appended claims.

The invention claimed is:

1. A system for warning a failure to wear a seat belt to urge a vehicle operator to wear the seat belt, comprising:
    a sound emitter for emitting warning sounds;
    a seat belt sensor for detecting a fastened state of a seat belt;
    a vehicle speed sensor;
    an electronic controller for receiving a detection signal from said seat belt sensor and a vehicle speed signal from said vehicle speed sensor, and activating said sound emitter with a seat belt warning sound according to said detection signal from said seat belt sensor and vehicle speed signal from said vehicle speed sensor; and
    a sensor for detecting an alarm state having a lower priority than a failure to wear a seat belt, said electronic controller being adapted in such a manner that the sound emitter is activated in a pattern different from said seat belt warning sound only during a silent state of said sound emitter when said lower priority alarm state is produced;
    wherein said electronic controller is adapted to activate said sound emitter when a vehicle speed is higher than a first threshold level and said seat belt is not fastened, said sound emitter cyclically alternating between a sound emitting state and the silent state when activated.

2. A seat belt warning system according to claim 1, wherein said silent state lasts for a period of at least three seconds each time.

3. A seat belt warning system according to claim 2, wherein said silent state lasts for a period of at least 12 seconds each time.

4. A seat belt warning system according to claim 1, further comprising an alarm lamp, said electronic controller lighting up said alarm lamp substantially continually when said sound emitter is activated.

5. A seat belt warning system according to claim 1, further comprising an alarm lamp, said electronic controller lighting up said alarm lamp only in each sound emitting state of said sound emitter.

6. A scat belt warning system according to claim 1, further comprising a panel display, said electronic controller displaying a seat belt warning on said panel display substantially continually when said sound emitter is activated.

7. A seat belt warning system according to claim 1, further comprising a panel display, said electronic controller displaying a seat belt warning only in each sound emitting state of said sound emitter.

8. A seat belt warning system according to claim 1, wherein said sound emitter emits sound intermittently during each sound emitting state thereof.

9. A seat belt warning system according to claim 8, further comprising an alarm lamp, said electronic controller blinking said alarm lamp in synchronism with the intermittent sound emitted from said sound emitter.

10. A seat belt warning system according to claim 1, wherein said electronic controller is adapted to activate said sound emitter when a vehicle speed is higher than a first threshold level and said seat belt is not fastened, only after a prescribed waiting period.

11. A seat belt warning system according to claim 1, wherein said sound emitter is activated when a vehicle speed continues to be higher than said first threshold level for a prescribed time period and said seat belt is not fastened.

12. A seat belt waning system according to claim 1, wherein said sound emitter is also activated for a prescribed time period after an ignition switch is turned on if said seat belt is not fastened.

13. A seat belt warning system according to claim 1, wherein an activated state of said sound emitter is interrupted when said vehicle speed has dropped below a second threshold level which is lower than said first threshold level, and resumed when said vehicle speed has exceeded said first threshold level.

14. A seat belt warning system according to claim 13, wherein if said vehicle speed dropped below said second threshold level during a sound emitting state of said sound emitter, said activated state of said sound emitter is interrupted upon completion of the ongoing sound emitting state.

15. A seat belt warning system according to claim 1, further comprising a sensor for detecting an alarm state having a higher priority than a failure to wear a seat belt, said electronic controller being adapted in such a manner that said activated state of said sound emitter is superseded by an activation of the sound emitter in a pattern different from said seat belt warning sound as an interrupt routine as soon as said higher priority alarm state is produced, and that said activation of said sound emitter is resumed as a continuation of a preceding state of said sound emitter as soon as said higher priority alarm state is canceled.

16. A seat belt warning system according to claim 15, wherein said alarm state having a higher priority than a failure to wear a seat belt consists of a state in which the vehicle speed is greater than a prescribed limit speed.

17. A seat belt warning system according to claim 15, wherein a single sound emitter emits sounds of both the preceding state and the higher priority alarm state.

18. A seat belt warning system according to claim 1, wherein said alarm state having a lower priority than a failure to wear a seat belt consists of a state in which a parking brake is failed to be released.

19. A seat belt warning system according to claim 1, wherein a single sound emitter emits sounds of both the lower priority alarm state and the failure to wear a seat belt state.

20. A seat belt warning system according to claim 1, further comprising a panel display, said electronic controller displaying on said panel display a seat belt warning in each sound emitting state of said sound emitter and a lower priority warning in each silent state of said sound emitter when a vehicle speed is higher than a first threshold level, said seat belt is not fastened and said lower priority warning state is produced at the same time.

* * * * *